United States Patent [19]
Perlman

[11] Patent Number: 6,151,361
[45] Date of Patent: Nov. 21, 2000

[54] SYSTEM AND METHOD FOR REDUCING MULTIPASS SIGNAL DEGRADATION

[75] Inventor: Stuart Stanley Perlman, Princeton, N.J.

[73] Assignee: Thomson Licensing S.A., Boulogne, France

[21] Appl. No.: 08/999,448

[22] Filed: Dec. 29, 1997

[51] Int. Cl.$^7$ ................................................. H04N 7/12
[52] U.S. Cl. .................. 375/240.03; 382/233; 382/235; 382/240; 382/251
[58] Field of Search ................ 375/240, 240.03; 348/405; 358/13, 404; 382/232, 235, 240, 251

[56] References Cited

U.S. PATENT DOCUMENTS

| | | | |
|---|---|---|---|
| 4,746,978 | 5/1988 | Shimura | 358/133 |
| 5,237,397 | 8/1993 | Mighdoll et al. | 358/13 |
| 5,668,598 | 9/1997 | Linzer et al. | 348/402 |
| 5,748,793 | 5/1998 | Sanpei | 382/251 |
| 5,777,677 | 7/1998 | Linzer et al. | 348/397 |
| 5,870,497 | 2/1999 | Galbi et al. | 382/232 |
| 5,896,203 | 4/1999 | Shibata | 358/404 |

FOREIGN PATENT DOCUMENTS

| | | |
|---|---|---|
| 0 509 576 A2 | 10/1992 | European Pat. Off. |
| 0 627 858 A2 | 12/1994 | European Pat. Off. |
| 0 710 030 A1 | 5/1996 | European Pat. Off. |
| 0 823 822 A2 | 2/1998 | European Pat. Off. |
| 97/39584 | 10/1997 | WIPO |

OTHER PUBLICATIONS

PCT International Search Report.
Chang et al., "Error Accumulation of Repetitive Image Coding", May 30, 1994, pp. 201–204.
IBM Technical Disclosure Bulletin, vol. 39, No. 04, Apr. 1996.

*Primary Examiner*—Chris S. Kelley
*Assistant Examiner*—Shawn S. An
*Attorney, Agent, or Firm*—Joseph S. Tripoli; Ronald H. Kurdyla

[57] ABSTRACT

A system and method reduces multipass signal degradation attributable to non-linear processing, namely quantization and dequantization. In one embodiment, a decoder decodes a predetermined unit of data utilizing a first quantization value. A quantization restrictor receives the first quantization value and generates a second quantization value having a restricted value wherein the second quantization value is equal to the first quantization value divided by a given integer. An encoder encodes the predetermined unit of data utilizing the second quantization value. A function unit can be provided for performing a predetermined pixel domain function on the predetermined unit of data between the decoding operation of the decoder and the encoding operation of the encoder. In this system, the decoder performs an inverse discrete cosine transform on the predetermined unit of data, and dequantizes the predetermined unit of data. The encoder performs a discrete cosine transform on the predetermined unit of data, and quantizes the predetermined unit of data.

7 Claims, 4 Drawing Sheets

SYSTEM AND METHOD FOR REDUCING MULTIPASS SIGNAL DEGRADATION

GOVERNMENT LICENSE RIGHTS

The U.S. Government has a paid-up license in this invention and the right in limited circumstances to require the patent owner to license others on reasonable terms as provided for by the terms of contract number 70NANB5H1171 awarded by the National Institute of Standards and Technology.

FIELD OF THE INVENTION

The present invention generally relates to reducing signal degradation that occurs during processing, and more particularly, to a system and method for minimizing multipass signal losses resulting from the non-linear processing of image signals, such as high definition television (hereinafter, "HDTV") signals.

BACKGROUND OF THE INVENTION

The progress of modern technology has provided advancements in many technical areas. Image processing is definitely one of these areas. The use of compressed bit streams now enables large quantities of digital video data to be transmitted using relatively small bandwidths. Consistent with this progress in technology is the coming of HDTV. The introduction of HDTV will present many new technological issues. For example, studio environment processing of HDTV signals compressed in accordance with a known standard, such as motion picture expert group-type 2 (hereinafter, "MPEG-2") or the like, may require a new signal standard so that production editing and merging of HDTV signals is possible with minimal quality loss and degradation. Such production processing will generally require operating in the time (i.e., pixel) domain, as opposed to the frequency domain of coded images. Pixel domain processing requires decoding of an input HDTV MPEG-2 bit stream to the pixel domain. After processing is complete, the resulting images must be encoded back to an MPEG-2 bit stream for delivery as a studio output signal, or for storage and subsequent use in the studio environment.

One option for handling HDTV signals in the studio environment is to use high bit rates and restricted group of pictures (hereinafter, "GOP") structures. For example, one could consider using intra-coded (hereinafter, "I") macroblocks only, or a slightly more complicated GOP structure consisting of repeating I and bidirectionally predictive-coded (hereinafter, "B") pictures only (i.e., IBIBI). Closely spaced I frames can be used to simplify the processing for editing cuts and inserts. Some proposals suggest significantly increasing the MPEG-2 bit rate above the Grand Alliance's HDTV bit rate of 20 megabits per second to bit rates such as 129 and 225 megabits per second, which with the addition of overhead bits could conform to existing OC-3 and OC-12 telecommunications standards.

One major problem with the use of pixel processing is that MPEG-2 decoding and re-encoding will be necessary for a processing pass, and this will generally cause progressive signal quality degradation. One of the most significant causes of such degradation will be the non-linear processing, namely the dequantization and requantization, of the HDTV signal. Considering that as many as eight (8) of these studio processing passes may be required for a typical production run, the problem of HDTV signal degradation must be addressed and solved.

SUMMARY OF THE INVENTION

Accordingly, it is an object of the present invention to provide a system and method for significantly reducing multipass losses resulting from non-linear processing of images signals, such as HDTV signals.

It is another object to provide a system and method that reduces multipass losses by restricting the quantization values used in encoding and decoding operations.

It is still another object to provide a system and method that restricts a macroblock quantization value for a given processing pass to a value selected from a given set of macroblock quantization values, wherein the macroblock quantization values that make up this given set are obtained from the macroblock quantization value for the previous processing pass.

It is yet another object to provide a system and method that restricts a macroblock quantization value for a given processing pass to a value equal to the macroblock quantization value for the previous processing pass divided by a given integer.

These and other objects can be achieved in accordance with the principles of the present invention by performing a first processing operation comprised of encoding and decoding a predetermined unit of data (e.g., an 8×8 luminance block of a macroblock, an entire macroblock, etc.) utilizing a first quantization value. A second processing operation is later performed by encoding and decoding the predetermined unit of data utilizing a second quantization value. The second quantization value is selected from a group of one or more integer values obtained by dividing the first quantization value by various integer values. In at least one embodiment, the group of integer values is obtained by dividing the first quantization value by integer values equal to $2^n$, where n is a non-negative integer. Between the first processing operation and the second processing operation, a predetermined pixel domain function, such as image re-sizing, can be performed on the predetermined unit of data. In these processing operations, encoding is achieved by performing a discrete cosine transform on the predetermined unit of data, and quantizing the predetermined unit of data. Similarly, decoding is achieved by performing an inverse discrete cosine transform on the predetermined unit of data, and dequantizing the predetermined unit of data.

These and other objects can also be achieved in accordance with the principles of the present invention with a system that includes a decoder for decoding a predetermined unit of data utilizing a first quantization value. A quantization restrictor receives the first quantization value and generates a second quantization value having a restricted value. In particular, the second quantization value is selected from a group of one or more integer values obtained by dividing the first quantization value by integer values. In at least one embodiment, the group of integer values is obtained by dividing the first quantization value by integer values equal to $2^n$, where n is a non-negative integer. An encoder encodes the predetermined unit of data utilizing the second quantization value. A function unit can be provided for performing a predetermined pixel domain function on the predetermined unit of data between the decoding operation of the decoder and the encoding operation of the encoder. In this system, the decoder includes means for performing an inverse discrete cosine transform on the predetermined unit of data, and means for dequantizing the predetermined unit of data. The encoder includes means for performing a discrete cosine transform on the predetermined unit of data, and means for quantizing the predetermined unit of data.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
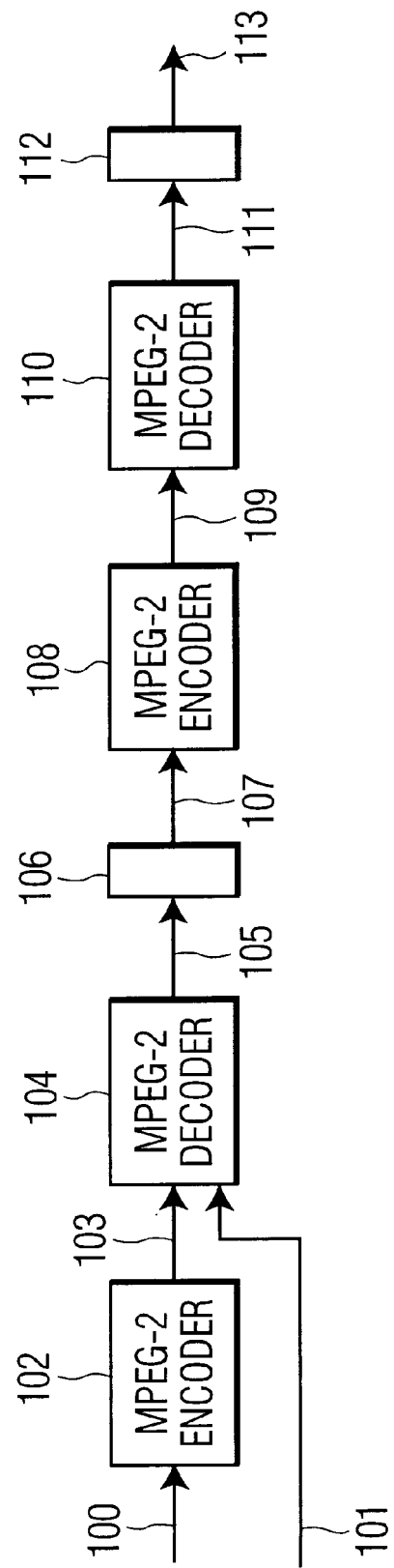
FIG. 1 illustrates an exemplary system configuration for processing HDTV MPEG-2 signals.

Turning now to the drawings and referring to FIG. 1, an exemplary system configuration for processing HDTV MPEG-2 signals is shown. Portions of this system may exist within an HDTV studio environment. In FIG. 1, inputs may be provided as either a first input signal 100 representing, for example, YUV pixels (pursuant to the MPEG-2 specification) which need to be encoded to an HDTV MPEG-2 profile for studio and storage, or a second input signal 101 representing a previously encoded HDTV MPEG-2 bit stream. For simplicity of explanation, assume in the following disclosure that we are processing only a predetermined unit of video data, such as an 8×8 luminance block (of pixels or pels) of a macroblock. Accordingly, for purposes of explanation, assume that the first and second input signals 100 and 101 each represent an 8×8 luminance block of a macroblock. It should be understood however, that in practice, the disclosed invention processes (i.e., encodes and/or decodes) all portions of macroblocks in accordance with the established MPEG-2 specification.

In FIG. 1, the first input signal 100 is provided to an MPEG-2 encoder 102, which encodes the signal 100 to an HDTV MPEG-2 signal 103 by performing a discrete cosine transform (hereinafter, "DCT") and a quantizing operation, as is known in the art. Processing of the first input signal 100 by the encoder 102 may be an original coding pass that occurs before studio input. More details on the operation of the encoder 102 will be provided later in this disclosure. The bit rate actually used is not particularly significant for purposes of this disclosure since the present invention is concerned primarily with reducing multipass quantization losses.

The second input signal 101 representing a previously encoded HDTV MPEG-2 bit stream, or alternatively, the HDTV MPEG-2 signal 103 output from the encoder 102 is input to an MPEG-2 decoder 104, which generates a time (i.e., pixel) domain signal 105 by performing a dequantization operation, an inverse DCT and a rounding operation, as is known in the art. This operation by the decoder 104 may represent a first decoding pass within the studio environment. More details on the operation of the decoder 104 will be provided later in this disclosure. The pixel domain signal 105 then passes to a function unit 106, which performs a known function to generate a modified pixel domain signal 107. Function unit 106 may, for example, adjust the bit rate, re-size the image represented by the pixel domain signal 105, or perform any other pixel domain function that is necessary in studio processing.

A first coding/decoding error can be defined as the magnitude of the difference between the first input signal 100 and the pixel domain signal 105. This pixel difference (i.e., error) can generally be quite large because it is the first time the input signal has been quantized and dequantized. The first coding/decoding error, the magnitude of which is determined by the quantization values used by the MPEG-2 coding algorithm for the selected bit rate, can not be eliminated. The higher the bit rate used, the lower the error. The modified pixel domain signal 107 output from the function unit 106 is then input to an MPEG-2 encoder 108. The encoder 108, which performs the same functions as the MPEG-2 encoder 102, generates an HDTV MPEG-2 signal 109. This operation by the encoder 108 may represent a first coding pass within the studio environment. The HDTV MPEG-2 signal 109 can be saved for later use, or can be used with subsequent processing passes.

Assuming that additional processing passes are performed, the HDTV MPEG-2 signal 109 output from the encoder 108 is then input to an MPEG-2 decoder 110, which generates a pixel domain signal 111 by performing the dequantization operation, inverse DCT and rounding operation, just as MPEG-2 decoder 104. This operation by the decoder 110 may represent a second decoding pass within the studio environment. The pixel domain signal 111 output from the decoder 110 may then pass to a function unit 112, which performs a known pixel domain function, such as bit rate adjustment or image re-sizing, etc., to generate a modified pixel domain signal 113.

A second coding/decoding error can be defined as the magnitude of the difference (in pixels) between the pixel domain signal 107 input to the encoder 108 and the pixel domain signal 111 output from the decoder 110. Assuming that the operation of function unit 106 is transparent and introduces no signal loss or degradation, then the first and second coding/decoding errors represent the losses due to the encoding and decoding processes, and the main causes of signal degradation may be the non-linear effects of quantizing and rounding. Operation of the encoders 102 and 108, and decoders 104 and 110 will now be explained.

Figure 2:
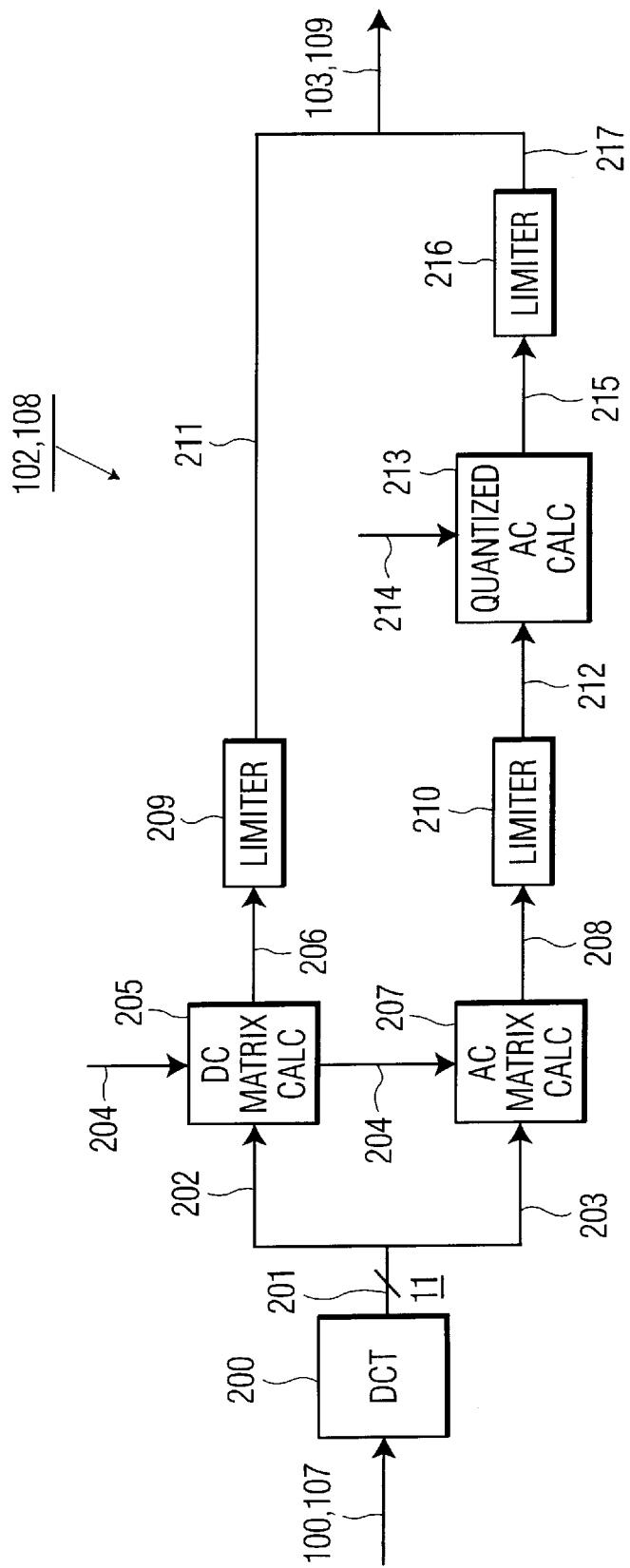
FIG. 2 illustrates the details of the MPEG-2 encoders 102 and 108 in FIGS. 1 and 4.

Referring now to FIG. 2, the details of the MPEG-2 encoders 102 and 108 in FIG. 1 are shown. In FIG. 2, a DCT unit 200 receives the first input signal 100 (when encoder 102 is being depicted) or the modified pixel domain signal 107 (when encoder 108 is being depicted). DCT unit 200 performs a DCT to generate a frequency domain output signal 201 with, for example, eleven (11) bit coefficient values. The direct current (hereinafter, "DC") component 202 and the alternating current (hereinafter, "AC") components 203 of the frequency domain signal 201 are treated differently by appropriate matrix equations using MPEG-2 specified intra quantizer matrix weights 204, which are well known by those skilled in the art. Specifically, a DC matrix calculation unit 205 generates a quantized DC signal 206 exhibiting a value calculated according to the following MPEG-2 specified equation:

value of quantized DC signal (206)=DC component (202)//DC weight (204)

In the foregoing equation, the symbol "//" denotes integer division with rounding performed to the nearest integer; one-half integer values are rounded away from zero.

Similarly, an AC matrix calculation unit 207 generates quantized AC signals 208, wherein the value of each one of the quantized AC signals 208 is calculated according to the following MPEG-2 specified equation:

value of quantized AC signal (208)=16*[corresponding AC component (203) corresponding AC weight (204)]

In the foregoing equation, the symbol "*" denotes a multiplication operator. Next, values of the quantized DC signal 206 and the quantized AC signals 208 are limited by limiters 209 and 210, respectively. In the disclosed embodiment, since the frequency domain signal 201 represents eleven (11) bit coefficient values, limiters 209 and 210 each restrict signal values to between +2047 and −2047. Thereafter, limiters 209 and 210 provide output of limited quantized DC and AC signals 211 and 212, respectively.

The limited quantized AC signals 212 are next input to a quantized AC calculation unit 213 which modifies the signals 212 by an MPEG-2 specified equation that is a function of a quantization value 214 for the given macroblock. The quantization value 214 is selected by a rate controller (not shown) of the encoder, and is used to help maintain the bit stream at a desired rate. Specifically, the quantized AC calculation unit 213 generates new quantized AC signals 215, wherein the value of each one of the new quantized AC signals 215 is calculated according to the following MPEG-2 specified equation:

value of new quantized AC signal (215)=[value of corresponding quantized AC signal (212)+sign (value of corresponding quantized AC signal (212))*((p*quantization value (214))//q)]/ [2*quantization value (214)]

where, according to a preferred embodiment, p=3 and q=4. In the foregoing equation, the symbol "/" denotes integer division with truncation of the result towards zero. Also, the term "sign" is defined as follows:

sign x=1, if x>0;

sign x=0, if x=0;

and sign x=−1, if x<0

The values of the new quantized AC signals 215 are then limited by limiter 216. In the disclosed embodiment, limiter 216 restricts signal values to between +2047 and −2047 to thereby output new limited quantized AC signals 217. Thereafter, the new limited quantized AC signals 217 are combined with the limited quantized DC signal 211 provided from limiter 209 to form the frequency domain HDTV MPEG-2 signal 103 (when encoder 102 is being depicted in FIG. 2), or 109 (when encoder 108 is being depicted in FIG. 2). As indicated by the foregoing description, the encoders 102 and 108 of FIG. 1 perform the DCT and quantizing operations specified by the MPEG-2 standard.

Figure 3:
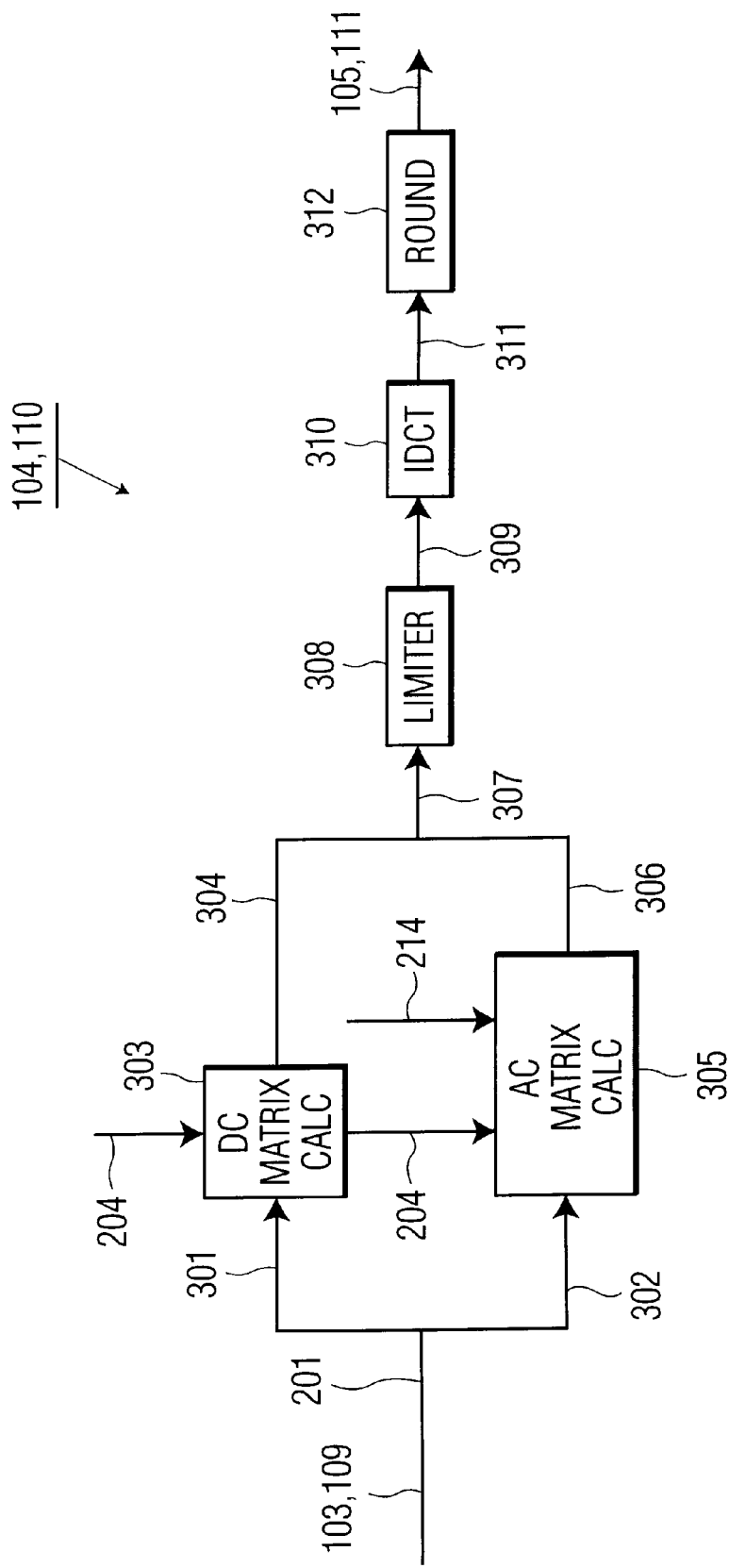
FIG. 3 illustrates the details of the MPEG-2 decoders 104 and 110 in FIGS. 1 and 4.

Referring now to FIG. 3, the details of the MPEG-2 decoders 104 and 110 in FIG. 1 are shown. In FIG. 3, the frequency domain HDTV MPEG-2 signal 103 (when decoder 104 is being depicted) or 109 (when decoder 110 is being depicted) is provided as an input. The DC component 301 and the AC components 302 of this input signal 103, 109 are treated differently by appropriate matrix equations using the MPEG-2 specified intra quantizer matrix weights 204. Specifically, a DC matrix calculation unit 303 generates a dequantized DC signal 304 exhibiting a value calculated according to the following MPEG-2 specified equation:

value of dequantized DC signal (304)=DC component (301)*DC weight (204)

Similarly, an AC matrix calculation unit 305 generates dequantized AC signals 306, wherein the value of each one of the dequantized AC signals 306 is calculated according to the following MPEG-2 specified equation:

value of dequantized AC signal (306)=[2*quantization value (214)*corresponding AC component (302)*corresponding AC weight (204)]/16

AC matrix calculation unit 305 also adds a rounding value ("round") to the value of each dequantized AC signal 306. This rounding value is defined as follows:

round=1 if the value of dequantized AC signal (306)<0 and even, round=−1 if the value of dequantized AC signal (306)>0 and even, and round=0 if the value of dequantized AC signal (306)=0.

Note that the DC and AC matrix calculation units 303 and 305 of FIG. 3 essentially perform the inverse of the operations performed by DC and AC matrix calculation units 205 and 207 of FIG. 2, respectively. Next, the dequantized DC signal 304 is combined with the dequantized AC signals 306 (each modified by the "round" value) to form a combined signal 307. The values represented by this combined signal 307 are then limited by limiter 308 to produce a limited dequantized signal 309. In the disclosed embodiment, limiter 308 restricts the values of the combined signal 307 to between +2047 and −2047. The limited dequantized signal 309 is next provided to an inverse DCT unit 310 which performs an inverse DCT to generate a pixel domain signal 311. The pixel domain signal 311 is then rounded by rounding unit 312 to produce the pixel domain signal 105 (when decoder 104 is being depicted in FIG. 3) or 111 (when decoder 110 is being depicted in FIG. 3). As indicated by the foregoing description, the decoders 104 and 110 of FIG. 1 perform the inverse DCT and dequantizing operations specified by the MPEG-2 standard.

Figure 4:
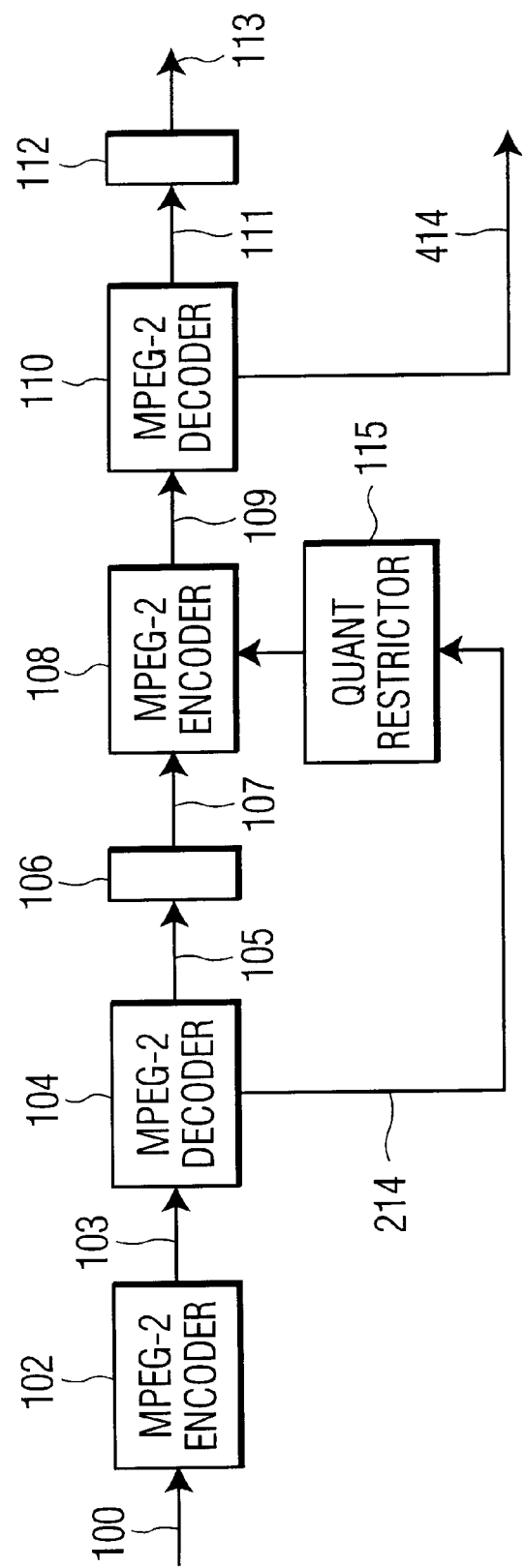
FIG. 4 illustrates a system configuration for processing HDTV MPEG-2 signals in accordance with the principles of the present invention.

Referring now to FIG. 4, a system configuration for processing HDTV MPEG-2 signals in accordance with the principles of the present invention is shown. The system represented in FIG. 4 is essentially the same as the system represented in FIG. 1, except that the system of FIG. 4 further includes quantization restrictor 115. Other than this difference, the components shown in FIG. 4 are the same as the components shown in FIG. 1 and like reference numerals are employed to represent this fact. In FIG. 4, quantization restrictor 115 receives from decoder 104 the quantization value 214 for the given macroblock being processed. This quantization value 214 is the same quantization value used by encoder 102 and decoder 104 to encode and decode the given macroblock. Quantization restrictor 115 restricts the quantization value that encoder 108 and decoder 110 can utilize in the next processing pass to encode and decode the given macroblock. The intent here is to restrict the encoder 108 from using quantization values for the given macroblock that will cause excessive quantization errors and will result in large signal degradation. Experimentation has shown that restricting macroblock quantization values can have very favorable effects in terms of reducing signal degradation. However, the manner in which the macroblock quantization values are restricted is a prescribed one.

Specifically, the present invention provides that a macroblock quantization value for a given processing pass be restricted to a value selected from a given set of macroblock quantization values. The macroblock quantization values that make up this given set are obtained from the macroblock quantization value for the previous processing pass. As a first criterion, the macroblock quantization values of the set are all integer values. As a second criterion, the macroblock quantization values of the set are obtained by dividing the macroblock quantization value for the previous processing pass by positive integer values (i.e., 1, 2, 3, 4, 5 . . . up to the value being divided). According to at least one embodiment, these positive integer values are limited to those values equal to powers of two (i.e., $2^n$, where n is a non-negative integer; accordingly, the integer values would equal 1, 2, 4, 8, 16 . . . ). Finally, as a third criterion, the macroblock quantization value finally selected from the set of eligible values must be one that is allowable under the applicable compression standard (here, MPEG-2).

As an example, assume in FIG. 4 that the macroblock quantization value 214 utilized by encoder 102 and decoder 104 is equal to twenty (20). Quantization restrictor 115 receives the macroblock quantization value 214 from decoder 104, and from this value 214 generates the set of macroblock quantization values that may possibly be used by encoder 108 and decoder 110 for the next processing pass. In this case, the eligible macroblock quantization values for the next processing pass are: 20 (20/1), 10 (20/2), 5 (20/4), 4 (20/5), 2 (20/10) and 1 (20/20). Note that the values generated by dividing the macroblock quantization value 214 by the other integers (i.e., 3, 6–9 and 11–19) are not integer values, and therefore do not meet the first criterion recited above. As a general proposition, quantization restrictor 115 selects as a final value from the eligible set of macroblock quantization values, the value that is closest to the macroblock quantization value requested by the rate controller of the given encoder. Thereafter, decoder 110 can provide the selected macroblock quantization value 414 to a quantization restrictor (not shown) for a next processing pass. Particularly good experimental results have been achieved when the macroblock quantization value for a given processing pass is set exactly equal to the macroblock quantization value for the previous processing pass. However, in general, good experimental results have been achieved when the macroblock quantization value for a given processing pass is set equal to any value within the eligible set of values. It is noted that present invention avoids using a macroblock quantization value for a given processing pass that is larger than the macroblock quantization value used in the previous processing pass. The term "processing pass" here, of course, refers to a given encoding/decoding operation.

It is noted that FIG. 4 illustrates the system configuration for only two processing passes. It will be intuitive, however, that the system of FIG. 4 can be extended to accommodate as many processing passes as desired. That is, the system of FIG. 4 can be modified in accordance with the principles of the present invention to include additional encoders, decoders, function units and quantization restrictors. In such a modified configuration, a given quantization restrictor would receive a macroblock quantization value from the previous pass' decoder, and would generate a restricted macroblock quantization value for the applicable processing pass based on the received value. The restricted quantization value would, of course, be provided to the encoder of the applicable processing pass. In this manner, the present invention reduces the non-linear effects of successive quantization and dequantization operations.

Although this disclosure assumes for purposes of explanation that only an 8×8 luminance block of a given macroblock is being processed, in practice, the other luminance blocks and chrominance block(s) of the given macroblock are also processed in accordance with the disclosed principles. Also, it should be clear from this disclosure that the principles of the present invention are applicable to a video bit stream on a macroblock-by-macroblock basis. That is, the present invention restricts quantization values for all macroblocks, but does so individually for each given macroblock in a video sequence. To facilitate understanding, however, the foregoing disclosure has been presented in the context of a single given macroblock.

As reflected in the foregoing disclosure, the present invention is capable of reducing signal degradation that results from the non-linear processing of an image signal, namely an HDTV MPEG-2 signal. This favorable result occurs through the restriction of macroblock quantization values used in a sequence of processing passes. Accordingly, the present invention is particularly applicable to studio environments where multipass processing of image signals, such as signals in an HDTV MPEG-2 format, is performed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made without departing from the central scope thereof. Therefore, it is intended that the present invention not be limited to the particular embodiment disclosed as the best mode contemplated for carrying out the invention, but that the present invention includes all embodiments falling within the scope of the appended claims.

What is claimed is:

1. A method for reducing signal degradation, comprising the steps of:

performing a first processing operation including the steps of encoding and decoding a predetermined unit of data utilizing a first quantization value; and performing a second processing operation including the steps of encoding and decoding the predetermined unit of data utilizing a second quantization value, wherein said second quantization value is determined in accordance with the steps of:

deriving a set of second quantization values by dividing the first quantization value by a number of integer values from 1 to the first quantization value, inclusive;

eliminating all non integer values obtained by division; and selecting the second quantization value from the derived set of second quantization values which is closest a quantization value requested by a rate controller.

2. The method as claimed in claim 1, further comprising a step of performing a predetermined pixel domain function on the predetermined unit of data between the first processing operation and the second processing operation.

3. The method as claimed in claim 1, wherein the predetermined unit of data comprises an 8×8 luminance block of a macroblock.

4. The method as claimed in claim 1, wherein the encoding step in each of the first and second processing operations comprises substeps of:

performing a discrete cosine transform on the predetermined unit of data; and quantizing the predetermined unit of data.

5. The method as claimed in claim 1, wherein the decoding step in each of the first and second processing operations comprises substeps of:

performing an inverse discrete cosine transform on the predetermined unit of data; and dequantizing the predetermined unit of data.

6. An apparatus for reducing signal degradation, comprising:

a decoder for decoding a predetermined unit of data utilizing a first quantization value;

a quantization restrictor for receiving the first quantization value and generating a set of second quantization value having a restricted value determined by generating a set of second quantization values by dividing the first quantization value by a number of integer values from 1 to the first quantization value inclusive and eliminating all non integer values obtained by division;

a selector for selecting the second quantization value from the set of second quantization values closest a quantization value requested by a rate controller; and an encoder for encoding the predetermined unit of data utilizing the second quantization value.

7. The apparatus as claimed in claim 6, wherein the predetermined unit of data comprises an 8×8 luminance block of a macroblock.

* * * * *